United States Patent [19]

Oda et al.

[11] Patent Number: 4,843,040

[45] Date of Patent: Jun. 27, 1989

[54] SILICON NITRIDE SINTERED BODIES

[75] Inventors: Isao Oda, Nagoya; Tomonori Takahashi, Chita, both of Japan

[73] Assignee: NGK Insulators, Ltd., Nagoya, Japan

[21] Appl. No.: 12,159

[22] Filed: Feb. 9, 1987

[30] Foreign Application Priority Data

Feb. 20, 1986 [JP] Japan .................................. 61-33716

[51] Int. Cl.$^4$ ....................... C04B 35/56; C04B 35/50
[52] U.S. Cl. ......................................... 501/92; 501/97; 427/249; 428/698; 428/446
[58] Field of Search ....................... 501/96, 97, 98, 92; 428/698, 446; 51/295; 427/249

[56] References Cited

U.S. PATENT DOCUMENTS

| | | | |
|---|---|---|---|
| 4,226,914 | 10/1980 | Temer et al. | 428/466 |
| 4,288,495 | 9/1981 | Temer et al. | 428/446 |
| 4,310,481 | 1/1982 | Baney | 264/65 |
| 4,340,636 | 7/1982 | De Bolt et al. | 428/215 |
| 4,409,003 | 10/1983 | Sarin et al. | 428/698 X |
| 4,424,096 | 1/1984 | Kumagai | 156/643 |
| 4,515,860 | 5/1985 | Holzl | 428/408 |
| 4,608,326 | 8/1986 | Neukermans et al. | 430/5 |
| 4,634,635 | 1/1987 | Shuaishi et al. | 428/446 |
| 4,652,276 | 3/1987 | Burden | 51/308 |
| 4,699,890 | 10/1987 | Matsui | 501/98 |

FOREIGN PATENT DOCUMENTS 2344512 10/1977 France .
60-224783 11/1985 Japan .................................. 428/446

*Primary Examiner*—William R. Dixon, Jr.
*Assistant Examiner*—Ann M. Knab
*Attorney, Agent, or Firm*—Arnold, White & Durkee

[57] ABSTRACT

A silicon nitride sintered body having an improved oxidation resistance or wear resistance has in its surface a coating of silicon carbide. Particularly, the coating of silicon carbide is formed by CVD process.

17 Claims, No Drawings

SILICON NITRIDE SINTERED BODIES

BACKGROUND OF THE INVENTION

1. Field of the Invention

This invention relates to a silicon nitride sintered body having an improved oxidation resistance or wear resistance.

2. Related Art Statement

Silicon nitride sintered bodies are often used at their as-sintered or worked surfaces for gas turbine members and high temperature structural members. On the other hand, as disclosed in Japanese Patent laid open Nos. 60-161,383 and 60-200,882, the surface of the silicon nitride sintered body is covered with a coating of silicon nitride by a chemical vapor deposition (CVD) process to eliminate the surface defects and enhance the strength prior to the use.

In these silicon nitride sintered bodies constituting the above member at their as-sintered or worked surfaces, however, when used at high temperature, the oxidation resistance and the wear resistance are deteriorated as compared with the case of using at room temperatures. Therefore, when they are used as a gas turbine member or a high temperature structural member, the service life is considerably shortened.

Further, in the silicon nitride sintered body covered with the coating of silicon nitride by the CVD process, the coating of silicon nitride is destroyed by reacting with the sintered body thereby losing the effect of the coating formation.

SUMMARY OF THE INVENTION

It is an object of the present invention to overcome the above-mentioned drawbacks and provide a silicon nitride sintered body which is particularly excellent in oxidation resistance or wear resistance at high temperatures.

According to the invention, there is the provision of a silicon nitride sintered body having on its surface a coating of silicon carbide. In particular, the coating of silicon carbide is formed of a CVD process.

DETAILED DESCRIPTION OF THE INVENTION

According to the invention, the surface of the silicon nitride sintered body having high strength at high temperatures but low oxidation resistance and wear resistance is covered with a crystalline silicon carbide coating having high oxidation resistance and wear resistance and a high coexistent property with the silicon nitride sintered body to provide a silicon nitride sintered body having particularly improved oxidation resistance or wear resistance at high temperatures.

The term "silicon nitride sintered body" used herein means to include a pressureless sintered body, hot pressed or hot isostatic pressed sintered body and the like, which may occasionally contain various additives. However, the additives contained in the silicon nitride sintered body to be covered according to the invention are insignificant because the oxidation resistance or the wear resistance is improved by coating, so that it is possible to use any kind of silicon nitride sintered bodies. Further, the thickness of the silicon carbide coating is dependent on the producing method, but it is preferably within a range of 10–300 μm. This is due to the fact that when the thickness is less than 10 μm, it is difficult to obtain a uniform coating, while when it exceeds 300 μm, there remarkably appears a poor adhesion such as separation or the like resulting from the difference in thermal expansion coefficients between the silicon carbide coating and the silicon nitride sintered body. Furthermore, it is favorable that the thermal expansion coefficient of the silicon nitride sintered body to be covered be close to that of the silicon carbide as a coating.

The production of the silicon nitride sintered body according to the invention will be described below.

Although the silicon nitride sintered body generally has an as-sintered surface or a worked surface, either of these surfaces may be covered with the coating of silicon carbide.

The following processes can be utilized for forming the silicon carbide coating a CVD process in a which $SiCl_4$ gas or the like is reacted with $C_3H_8$ gas or the like in vapor phase to form a coating on the sintered body surface, a reaction sintering coating; process in which carbon is applied to the sintered body surface and then immersed in molten Si and reacted therewith at a temperature of 1,600°–1,700° C. to form a coating, a surface reacting carbonization process in which carbon is applied to the sintered body surface and heated at a temperature of 1,700° C. to conduct the formation of a coating through the following reaction;

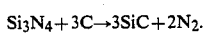

$$Si_3N_4 + 3C \rightarrow 3SiC + 2N_2.$$

Incidentally, according to any of the above-mentioned processes, the formed silicon carbide is α type or β type crystalline.

According to the invention, it is desirable that the thermal expansion coefficient of the silicon nitride sintered body is increased to be made close to that of silicon carbide as a coating. For this purpose, it is preferable that on the grain boundary of the silicon nitride sintered body is precipitated a crystalline phase having a high thermal expansion such as forsterite ($2MgO \cdot SiO_2$), enstatite ($MgO \cdot SiO_2$), yttrium silicate ($Y_2Si_2O_7$), yttrium-silicon-oxygen-nitrogen (Y—Si—O—N) or the like, or a solid solution thereof.

The following examples are given in the illustration of the invention and are not intended as limitations thereof.

EXAMPLE 1

On an as-sintered or worked surface of a silicon nitride sintered body having a composition and a thermal expansion coefficient as shown in the following Table 1 was formed a coating of silicon carbide having a crystalline structure as shown in Table 1 by a CVD process using raw gases and temperatures shown in Table 1, to thereby obtain silicon nitride sintered bodies (Nos. 1–10) according to the invention.

Samples of the silicon nitride sintered bodies (Nos. 1–10) having a diameter of 30 mm and a thickness of 10 mm, the surfaces of which are covered with a silicon carbide coating having a thickness of 10–150 μm, and samples of silicon nitride sintered bodies (Nos. 11–20) as Comparative Examples having a diameter of 30 mm and a thickness of 10 mm and no silicon carbide coating, were oxidized at a temperature of 1,400° C. for 100 hours to measure a weight gain by oxidation, from which a weight gain by oxidation per unit area was calculated. The obtained results are shown in Table 1.

Further, samples were also prepared wherein the curved surface of each of the silicon nitride sintered bodies (Nos. 1–10) having a diameter of 35 mm and a thickness of 8 mm was covered with a silicon carbide coating having a thickness of 150–300 μm, samples wherein one surface of 6 mm×16 mm of rectangular parallelpiped silicon nitride sintered bodies having a block form of 6 mm×16 mm×10 mm was covered with the silicon carbide coating, and samples of Comparative Examples wherein silicon nitride sintered bodies (Nos. 11, 13, 15, 17 and 19) having the same form as the above block form and no silicon carbide coating. With respect to these samples, the surface covered with the coating was mirror-finished to conduct a wear test at a temperature of 600° C. through a block on ring type machine. In this test, a load was 2 kg, a rotating speed was 1,000 rpm and a test period was 10 hours. From the wear volume of the rectangular parallelpiped samples was calculated a specific wear rate. The obtained results are shown in Table 1.

pansion coefficient as shown in the following Table 2 and then reacted with molten Si at a temperature as shown in Table 2 to form a coating of β-type crystalline silicon carbide on the surface of the sintered body, which was polished to obtain a silicon nitride sintered body covered with a coating of silicon carbide (Nos. 21–23) according to the invention. These silicon nitride sintered bodies were subjected to the oxidation test and the wear test in the same manner as in Example 1, together with Comparative Examples of silicon nitride sintered bodies having no coating of silicon carbide (Nos. 24–26). The measured results of weight gain by oxidation and specific wear rate are shown in Table 2.

TABLE 2

| No. | Composition of additive | Surface to be treated | Thermal expansion coefficient of sintered body (/°C.) | Reaction Temperature (°C.) | Weight gain by oxidation (mg/cm$^2$) | Specific wear rate (mm$^2$/N) |
| --- | --- | --- | --- | --- | --- | --- |
| Invention 21 | MgO | worked | $4.0 \times 10^{-6}$ | 1,600 | 0.9 | $8 \times 10^{-7}$ |
| 22 | MgO, Y$_2$O$_3$ | sintered | $3.9 \times 10^{-6}$ | 1,650 | 0.8 | $9 \times 10^{-8}$ |
| 23 | Al$_2$O$_3$, Y$_2$O$_3$ | worked | $3.7 \times 10^{-6}$ | 1,700 | 1.3 | $5 \times 10^{-7}$ |
| Comparative Example 24 | MgO | worked | $4.0 \times 10^{-6}$ | | >5 | $4 \times 10^{-7}$ |
| 25 | MgO, Y$_2$O$_3$ | sintered | $3.9 \times 10^{-6}$ | | >5 | $9 \times 10^{-8}$ |
| 26 | Al$_2$O$_3$, Y$_2$O$_3$ | worked | $3.7 \times 10^{-6}$ | | >5 | $8 \times 10^{-8}$ |

As apparent from the results of Table 2, the silicon nitride sintered bodies covered with the silicon carbide coating according to the invention, which were prepared by the surface reaction process, have considerably improved oxidation resistance as compared with the silicon nitride sintered bodies having no silicon carbide

TABLE 1

| No. | Composition of additive | Surface to be treated | Thermal expansion coefficient of sintered body (/°C.) | CVD process raw gas | Temperature | Crystalline type | Weight gain by oxidation (mg/cm$^2$) | Specific wear rate (mm$^2$/N) |
| --- | --- | --- | --- | --- | --- | --- | --- | --- |
| Invention 1 | MgO | worked | $4.0 \times 10^{-6}$ | SiCl$_4$, C$_3$H$_8$ | 1,350 | β | 0.6 | $3 \times 10^{-9}$ |
| 2 | " | sintered | " | " | 1,350 | β | 0.7 | $5 \times 10^{-9}$ |
| 3 | MgO, Y$_2$O$_3$ | worked | $3.9 \times 10^{-6}$ | Si(CH$_3$)$_4$ | 1,400 | α,β | 0.5 | $2 \times 10^{-9}$ |
| 4 | " | sintered | " | " | 1,400 | α,β | 0.6 | $2 \times 10^{-9}$ |
| 5 | Y$_2$O$_3$ | worked | $4.1 \times 10^{-6}$ | SiCl$_4$, C$_3$H$_8$ | 1,400 | β | 0.6 | $3 \times 10^{-9}$ |
| 6 | " | sintered | " | " | 1,400 | β | 0.4 | $6 \times 10^{-10}$ |
| 7 | MgO, Al$_2$O$_3$ | worked | $4.3 \times 10^{-6}$ | SiCl$_2$, (CH$_3$)$_2$ | 1,350 | α,β | 0.4 | $5 \times 10^{-10}$ |
| 8 | " | sintered | " | " | 1,350 | α,β | 0.5 | $8 \times 10^{-10}$ |
| 9 | Al$_2$O$_3$, Y$_2$O$_3$ | worked | $3.7 \times 10^{-6}$ | SiCl$_4$, C$_3$H$_8$ | 1,400 | β | 1.2 | $7 \times 10^{-9}$ |
| 10 | " | sintered | " | " | 1,400 | β | 1.4 | $6 \times 10^{-9}$ |
| Comparative Example 11 | MgO | worked | $4.0 \times 10^{-6}$ | | | | >5 | $4 \times 10^{-7}$ |
| 12 | " | sintered | " | | | | >5 | " |
| 13 | MgO, Y$_2$O$_3$ | worked | $3.9 \times 10^{-6}$ | | | | >5 | $9 \times 10^{-8}$ |
| 14 | " | sintered | " | | | | 2.3 | " |
| 15 | Y$_2$O$_3$ | worked | $4.1 \times 10^{-6}$ | | | | 4.2 | $6 \times 10^{-8}$ |
| 16 | " | sintered | " | | | | >5 | " |
| 17 | MgO, Al$_2$O$_3$ | worked | $4.3 \times 10^{-6}$ | | | | >5 | $3 \times 10^{-7}$ |
| 18 | " | sintered | " | | | | >5 | " |
| 19 | Al$_2$O$_3$, Y$_2$O$_3$ | worked | $3.7 \times 10^{-6}$ | | | | >5 | $8 \times 10^{-8}$ |
| 20 | " | sintered | " | | | | >5 | " |

As seen from the results of Table 1, the silicon nitride sintered bodies covered with the silicon carbide coating by CVD process according to the invention exhibit excellent oxidation resistance and wear resistance as compared with the silicon nitride sintered bodies having no coating.

EXAMPLE 2

Carbon was applied to a surface of a silicon nitride sintered body having a composition and a thermal excoating, but the improvement of wear resistance is not observed.

EXAMPLE 3

Carbon was applied to a surface of a silicon nitride sintered body having a composition and a thermal expansion coefficient as shown in the following Table 3 and then reacted with the silicon nitride sintered body at a temperature as shown in Table 3 to obtain a silicon nitride sintered body having a coating of β-type crystalline silicon carbide (Nos. 27-29). These sintered bodies were subjected to the oxidation test and the wear test in the same manner as in Example 1, together with silicon nitride sintered bodies having no coating of silicon carbide (Nos. 30-32) as Comparative Examples. The measured results of weight gain by oxidation and specific wear rate are shown in Table 3.

TABLE 3

| No. | Composition of additive | Surface to be treated | Thermal-expansion coefficient of sintered body (/°C.) | Reaction Temperature (°C.) | Weight grain by oxidation (mg/cm$^2$) | Specific wear rate (mm$^2$/N) |
| --- | --- | --- | --- | --- | --- | --- |
| Invention 27 | MgO | worked | $4.0 \times 10^{-6}$ | 1,750 | 0.9 | $7 \times 10^{-8}$ |
| 28 | MgO,Y$_2$O$_3$ | sintered | $3.9 \times 10^{-6}$ | 1,700 | 0.9 | $8 \times 10^{-8}$ |
| 29 | Y$_2$O$_3$ | worked | $4.1 \times 10^{-6}$ | 1,800 | 1.1 | $6 \times 10^{-8}$ |
| Comparative Example 30 | MgO | worked | $4.0 \times 10^{-6}$ | | >5 | $4 \times 10^{-7}$ |
| 31 | MgO, Y$_2$O$_3$ | sintered | $3.9 \times 10^{-6}$ | | >5 | $9 \times 10^{-8}$ |
| Example 32 | Y$_2$O$_3$ | worked | $4.1 \times 10^{-6}$ | | 2.3 | $6 \times 10^{-8}$ |

As apparent from the results of Table 3, the silicon nitride sintered bodies having the silicon carbide coating according to the invention, which were prepared by the surface reaction process, have a considerably improved oxidation resistance as compared with the silicon nitride sintered bodies having no silicon carbide coating, but the improvement of wear resistance is not observed.

As mentioned above, the silicon nitride sintered body covered with the silicon carbide coating according to the invention possesses not only a high-temperature strength resulting from the silicon nitride sintered body itself but also high oxidation resistance and wear resistance resulting from the silicon carbide, which is applied to high temperature structural members such as engine parts, for example, a gas turbine engine rotor, a turbocharger rotor and the like to thereby improve the oxidation resistance or wear resistance thereof.

Further, according to the invention, the silicon carbide coating is particularly formed on the silicon nitride sintered body by CVD process, whereby the oxidation resistance and the wear resistance can simultaneously be improved.

What is claimed is:

1. A ceramic article comprising:
a silicon nitride sintered body; and
a silicon carbide coating on a surface of said silicon nitride sintered body;
wherein the thermal expansion coefficient of said silicon nitride sintered body is greater than $3.7 \times 10^{31\ 6}$/° C.

2. The ceramic article of claim 1, wherein said silicon nitride sintered body has a crystalline intergranular phase.

3. The ceramic article of claim 2, wherein said crystalline intergranular phase consists essentially of at least one phase selected from the group of phases consisting of forsterite (2MgO·SiO$_2$), enstatite (MgO·SiO$_2$), yttrium silicate (Y$_2$Si$_2$O$_7$), yttrium-silicon-oxygen nitrogen (Y—Si—O—N) or a solid solution thereof.

4. The ceramic article of claim 1, wherein said silicon carbide coating has a thickness in the range of 10-300 microns.

5. The ceramic article of claim 1, wherein said silicon carbide coating consists of α-type silicon carbide.

6. The ceramic article of claim 1, wherein said silicon carbide coating consists of β-type silicon carbide.

7. The ceramic article of claim 1, wherein said silicon carbide coating was applied on said surface by a chemical vapor deposition process.

8. The ceramic article of claim 1, wherein said ceramic article has a weight gain by oxidation in the range of 0.4-1.4 mg/cm$^2$.

9. The ceramic article of claim 1, wherein said ceramic article has a specific wear rate in the range of $5 \times 10^{-10}$-$8 \times 10^{-7}$ mm$^2$/N.

10. A ceramic article comprising:
a silicon nitride sintered body having a crystalline intergranular phase consisting essentially of at least one phase selected from the group of phases consisting of forsterite (2MgO·SiO$_2$), enstatite (MgO·SiO$_2$), yttrium silicate (Y$_2$Si$_2$O$_7$), yttrium-silicon-oxygen-nitrogen (Y—Si—O—N) or a solid solution thereof; and
a silicon carbide coating on a surface of said silicon nitride sintered body;
wherein the thermal expansion coefficient of said silicon nitride sintered body is greater than $3.7 \times 10^{-6}$/° C.

11. The ceramic article of claim 10, wherein said silicon carbide coating has a thickness in the range of 10-300 microns.

12. The ceramic article of claim 10, wherein said silicon carbide coating consists of α-type silicon carbide.

13. The ceramic article of claim 10, wherein said silicon carbide coating consists of β-type silicon carbide.

14. The ceramic article of claim 10, wherein said silicon carbide coating is applied on said surface by a chemical vapor deposition process.

15. The ceramic article of claim 10, wherein said ceramic article has a weight gain by oxidation in the range of 0.4-1.4 mg/cm$^2$.

16. The ceramic article of claim 10, wherein said ceramic article has a specific wear rate in the range of $5 \times 10^{-10}$-$8 \times 10^{-7}$ mm$^2$/N.

17. A ceramic article comprising:
a silicon nitride sintered body having a crystalline intergranular phase consisting essentially of at least one phase selected from the group of phases consisting of forsterite (2MgO·SiO$_2$), enstatite (MgO·SiO$_2$), yttrium silicate (Y$_2$Si$_2$O$_7$), yttrium-silicon-oxygen-nitrogen (Y—Si—O—N) or a solid solution thereof; and
a silicon carbide coating on a surface of said silicon nitride sintered body, said coating having a thickness in the range of 10-300 microns;
wherein the thermal expansion coefficient of said silicon nitride sintered body is greater than $3.7 \times 10^{-6}$/° C.

* * * * *